Patented Oct. 12, 1954

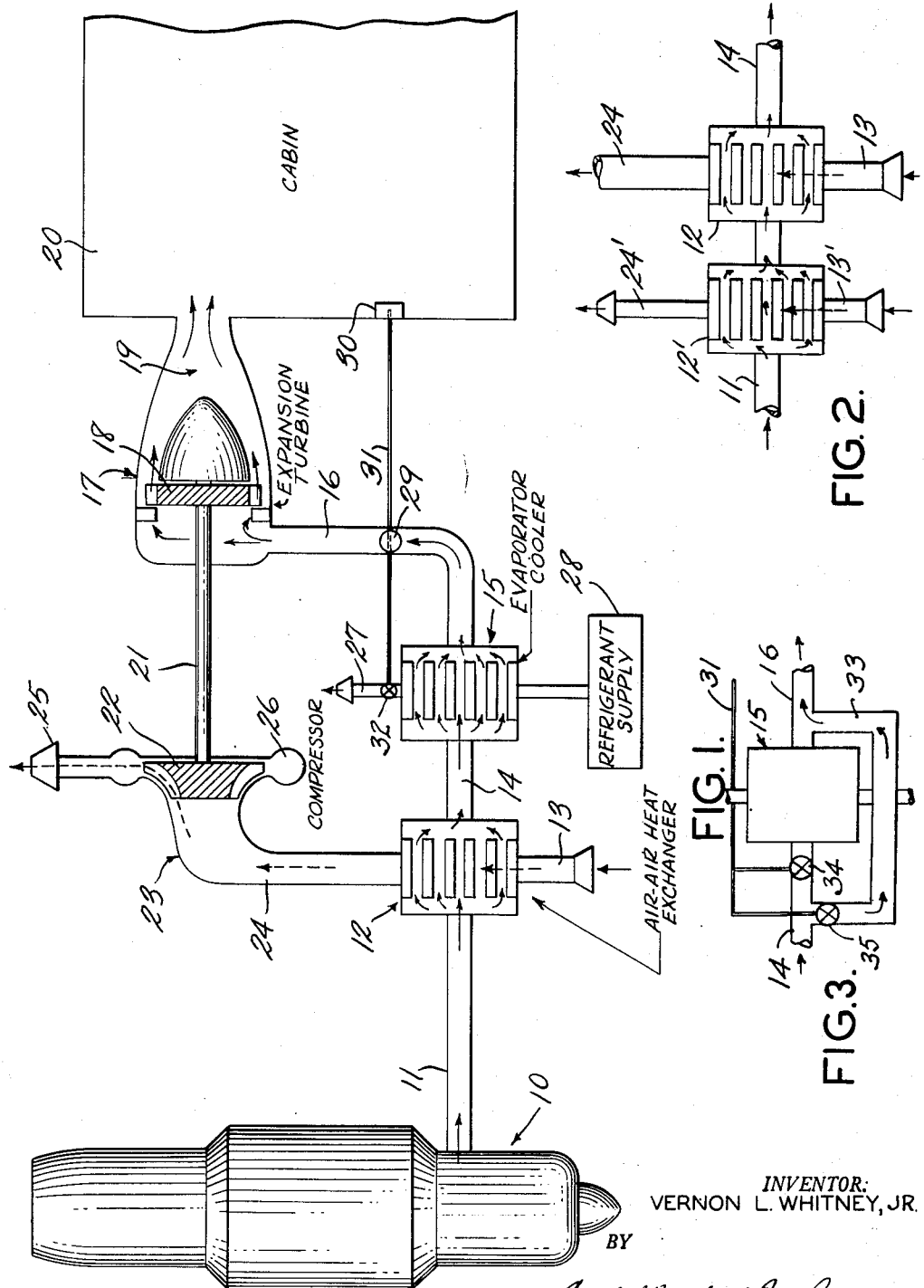

2,691,274

UNITED STATES PATENT OFFICE 2,691,274

AIR CONDITIONING SYSTEM FOR AIRCRAFT CABINS

Vernon L. Whitney, Jr., Hicksville, N. Y., assignor to Fairchild Engine and Airplane Corporation, Farmingdale, N. Y., a corporation of Maryland Application April 11, 1951, Serial No. 220,477

7 Claims. (Cl. 62—6)

1

This invention relates to air conditioning systems, and has particular reference to a system for maintaining the desired temperature in pressurized or unpressurized compartments of high-speed aircraft, although the invention is not limited to that use.

It is general practice to utilize some form of air cycle refrigeration system to cool the cabin or other compartment of military and commercial aircraft. Such systems generally comprise various combinations of one or more air-to-air heat exchangers, an expansion turbine and a turbine blower with the heat added to the cabin air supply line as the result of compression in the blower being rejected to atmosphere. The most common system of this type is the "simple" system which normally uses bleed air from a suitable high pressure source which is at an appreciably higher temperature than can be used directly in the cabin. This bleed air is first cooled in an air-to-air heat exchanger which lowers its temperature to a level approaching the ram air ambient temperature. The bleed air is then finally cooled by expansion in a suitable air turbine and supplied to the cabin with the power obtained from the air turbine utilized to drive a cooling air blower supplying all or part of the pressure required to circulate the cooling air through the low pressure side of the air-to-air heat exchanger.

In any such air cycle refrigeration system, considerable work is required to cool the bleed air down to the cabin temperature, but such cooling is not sufficient to reduce the cabin temperature the proper degree, so that it is necessary to supply the air at a temperature lower than the desired cabin temperature in order to obtain a net cooling effect for the cabin. Inasmuch as the cooling effect of such cabin supply air is a function of the total weight air flow multiplied by the temperature difference between the cabin temperature and the cabin supply temperature, it is evident that the cabin air flow required for a given cooling load is at the minimum when the temperature differential between the supply air and the cabin air is at the maximum. To illustrate, and assuming a bleed air temperature of 700° F., a cooling air temperature of 180° F. and a required cabin temperature of 100° F., it is evident that the minimum temperature of the air leaving the heat exchanger is above 180° F., since the cooling air temperature is 180° F. Actually, in the typical system under consideration, the cabin air exit temperature from the air-to-air heat exchanger is about 200° F., and

2 can be cooled to a sufficiently low temperature, say 0° F. by expansion in the turbine and thus may be used to cool the cabin. Accordingly, about one-half of the temperature drop in the turbine is not useable for cabin cooling, since the air temperature must be reduced to 100° F. before any effective cooling is obtained, thereby leaving a 100° F. differential between the supply air temperature and the desired cabin temperature. However, since the bleed air temperature was 700° F., it became necessary to remove 700° F. of heat from this air in order to bring it down to 0° F. so as to obtain 100° F. effective cooling temperature differential.

The foregoing analysis demonstrates that in any "simple" air cycle air conditioning system in which the cabin air is cooled in air-to-air heat exchangers by ram air ambient cooling air at ram air ambient temperature, the turbine inlet temperature cannot be lower than the ram air ambient temperature. Inasmuch as the temperature of ram air is influenced by the speed of the aircraft, the performance of any such given system is largely dependent on air speed. Since the ram air temperature rise is proportional to the square of the aircraft speed, cooling air taken into the aircraft can be at a temperature level in excess of 300° F. so that for very high speed aircraft, the turbine inlet temperature is limited to a value above the ram cooling air temperature in a system utilizing air-to-air heat exchangers. Inasmuch as the cabin temperature must be maintained at the reasonably low level to conform to human environmental requirements, the turbine is called upon to provide a much larger temperature reduction to maintain the necessary cabin air supply temperature. However, such a large reduction in cabin air supply temperature is not always feasible with the pressure drop that is available for the turbine.

In accordance with the present invention, an air conditioning system particularly adapted for aircraft is provided, which is essentially independent of varying aircraft speeds for maintaining uniform comfortable cabin temperatures, and which utilizes both high and low temperature air sources in conjunction with an evaporative cooler that employs a fluid which boils to absorb heat from the cabin air in a supply precooled by an air-to-air heat exchanger so as to lower the turbine inlet temperature to a value such that the expansion of the air in the turbine decreases the cabin supply air to the desired degree.

More particularly, the aircraft air conditioning system of this invention comprises a source of high pressure air, a source of low pressure air supplied to an air-to-air heat exchanger for precooling the high pressure air before the latter is cooled in an evaporative cooler, and an air expansion turbine driven by the cooled high pressure air which is further cooled in the turbine before being supplied to the cabin or other compartment, circulation of the low pressure air through the heat exchanger being afforded in part by a blower driven by the turbine.

For a more complete understanding of the invention, reference may be had to the accompanying drawings, in which:

Figure 1 is a schematic diagram of the air conditioning system of this invention;

Fig. 2 is a fragmentary schematic diagram of a modified arrangement in which a second air-to-air heat exchanger is utilized to precool the high pressure bleed air; and Fig. 3 is a fragmentary diagram of a modified form of evaporator cooler control.

Referring to Fig. 1 of the drawings, numeral 10 designates a suitable high pressure cooling air source which is shown by way of example as a jet engine, and the bleed air is discharged from the air compressor thereof to the bleed air duct 11, so that in effect, the pressure of the bleed air is boosted by the compressor to a point materially higher than that of ram air taken directly from the slip stream.

The duct 11 leads the bleed air from the compressor of jet engine 10 to the headers and tubes of a suitable air-to-air heat exchanger 12 where the high pressure air passing through the tubes thereof is appreciably cooled by interchange with cool air circulating around the tubes and supplied to heat exchanger 12 by duct 13 from the relatively low pressure source afforded by the atmosphere through a suitable opening in the skin of the aircraft and preferably arranged for ram pressure recovery.

The heat exchanger 12 provides a first cooling or precooling stage and the precooled air passes from heat exchanger 12 through duct 14 to evaporative cooler 15 wherein the high pressure air is further cooled to a value approaching the boiling temperature of the evaporative fluid which evaporates from the surfaces of the tubes through which the bleed air flows. The evaporative fluid is conveniently and preferably water, although it may be any other suitable refrigerant, such as "Freon" or the like, depending upon requirements. Although a tubular type air-to-air heat exchanger 12 and a tubular boiler type of evaporative cooler 15 are schematically shown in Fig. 1, they may be of any suitable construction.

After being further cooled in the second cooling stage provided by evaporative cooler 15, the bleed air passes through duct 16 to air expansion turbine 17 where the air is further cooled by reason of its expansion in driving the turbine rotor 18. The turbine 17 is of well-known construction. The thrice-cooled air discharged from the turbine 17 is led through duct 19 into the cabin 20 or to one or more compartments containing instruments or other equipment required to be maintained at a substantially uniform temperature.

The rotor 18 of turbine 17 is connected either directly by shaft 21, as shown, or through suitable gearing to the rotor 22 of compressor or blower 23. Blower or compressor 23 draws the spent cooling air through duct 24 from heat exchanger 12 after the air has circulated around the cooling tubes thereof and its temperature raised accordingly. The temperature of the spent cooling air is further raised by compression in the blower 23, but since the function of the blower 23 is merely to draw a sufficient volume of cooling air through the air-to-air heat exchanger 12, the increase in air temperature discharged by the blower 23 is immaterial. The spent cooling air from the scroll 26 of the blower 23 is discharged by duct 25 to atmosphere through an opening provided therefor in the aircraft skin and preferably arranged to take advantage of the eduction effect of the slip stream.

The refrigerant fluid such as water, which is converted from liquid to vapor state in evaporative cooler 15 is vented to the atmosphere through a duct 27 leading to a suitable opening in the skin of the aircraft provided for that purpose and preferably arranged to utilize the aspiration effect of the slip stream. The rate of refrigerant vapor flow through duct 27 from evaporative cooler 15 is proportional to the rate of heat absorbed by the boiling refrigerant from the high pressure cabin air flowing through duct 14 and the tubes of evaporative cooler 15. Since the evaporative fluid supplied to evaporator 15 must be stored and carried aboard the aircraft in a suitable container 28 during the entire flight period, its use must be conserved.

In operation of the air conditioning system of this invention as illustrated by Fig. 1, the air for supplying cabin 20 is bled from the high pressure source afforded by the compressor of the jet engine 10 and is led by duct 11 through air-to-air heat exchanger 12 where it is cooled in a first cooling stage by atmospheric air conducted out of contact with the cooling air from atmospheric source supplied through duct 13 and drawn through the heat exchanger 12 in proper volume by the blower 23. The spent and heated cooling air from heat exchanger 12 is ejected to atmosphere from the blower scroll 26 through duct 25.

The bleed air initially cooled in heat exchanger 12 is further cooled in the second stage afforded by evaporative cooler 15, wherein the coolant such as water, is boiled by the heat supplied by the bleed air led through the tubes of the cooler 15 by ducts 14 and 16, with the water vapor or other coolant vapor ejected to atmosphere through duct 27.

The twice-cooled bleed air is then led by duct 16 to expansion turbine 17 which serves as the third cooling stage, since the air expands through the turbine blades and diffusers. The bleed air is thus cooled and introduced into the cabin 20 at the required temperature, such as 0° F. in the assumed example.

It will be seen that the temperature of the bleed air is reduced to a minimum practical level in the first cooling stage afforded by air-to-air heat exchanger 12 before entering the evaporative cooler 15, so that the evaporative cooler is required to extract a minimum of compression heat and a minimum of the coolant is required with the result that less need be carried and stored in tank 28 aboard the aircraft. The evaporative cooler 15 operates on heat transfer from the bleed air to the coolant whose vaporizing temperature is substantially independent of aircraft speed and thus of ram air ambient temperature. The turbine discharge temperature and therefore the cooling capacity of the system embodying evaporative cooler 15 is affected to a far smaller degree by varying aircraft speeds than is a system not having such an evaporative cooler.

Further precooling of the bleed air may be effected by introducing a second air-to-air heat exchanger 12' in the bleed air duct 11, either ahead of the heat exchanger 12 as shown in Fig. 2, or behind it. In either case, heat exchanger 12' may be like heat exchanger 12 in that the cooling air, preferably under ram pressure, is circulated around the bleed air tubes passing through heat exchanger 12', and is then discharged through duct 24' to atmosphere, preferably aided by slip stream aspiration.

By employing more than one source of air having the least gross energy input in the form of pressure and temperature rise, the system of the present invention creates minimum drag on the aircraft, particularly since the bleed air is obtained from the normally high pressure source of the compression of jet engine 10 and the air-to-air heat exchanger cooling air is obtained from the normally low pressure source afforded by atmospheric air. In this way, all of the high pressure bleed air is employed as air for cabin cooling and provides the necessary pressure drop across the turbine 17 to produce the work needed for efficient cooling, since only low pressure air is used for heat exchanger cooling air. Also, since two sources of air are used, a lower quantity of bleed air is required than if bleed air is used both for cabin supply and heat exchanger cooling with resultant high aircraft drag.

Control or modulation of the rate of cooling the bleed air to the cabin may be effected in several ways, as by a throttle valve 29 located in duct 16 and controlled by a suitable thermostatic control 30 in the cabin 20 by means of electrical or mechanical connection 31. Similarly controlled throttle valves in air ducts 13 and 13' may be employed without creating back pressure on the bleed air. Alternatively, by-passes leading from the discharge of turbine 17 may be controlled by thermostatic regulators similar to 30 in accordance with known practice to regulate the cabin cooling rate without creating back pressure on turbine 17, or combinations of throttling valves and by-passes may be employed, depending upon requirements.

In case the output from expansion turbine 17 exceeds the requirements of the cabin 20, so that thermostat 30 partly closes valve 29 to thereby reduce the cooling capacity of the turbine 17, the evaporative cooler 15 is not appreciably affected and continues to use an unnecessarily high amount of coolant. In order to avoid such waste of coolant, a normally open throttle valve 32 in coolant vapor duct is controlled by thermostat 30 through connection 31 so as to partially close valve 32 when valve 29 is fully open, thereby creating sufficient back pressure on the evaporative cooler to raise the boiling pressure of the coolant. In this way, the amount of cooling required of the cooler 15 is limited automatically to the amount necessary to just meet the cabin cooling load, without the cooling waste occasioned when the cooling supply would otherwise exceed the demand. Similar control is obtainable by means of a by-pass 33 around the evaporator cooler 15, from duct 14 to duct 16, with control valves 34 and 35 in duct 14 and by-pass 33, respectively, as shown in Fig. 3. Valve 34 is normally open and by-pass valve 35 is normally closed, but both are controlled by cabin thermostat 30 through connection 31 so that when valve 29 is fully open at greatest cabin cooling demand, the valves 34 and 35 are in the aforementioned normal positions. However, when cabin cooling demand decreases materially, so that valve 29 is moved toward closed position by thermostat 30, valve 34 is closed and by-pass valve 35 is opened, so that evaporation of the coolant drops with the demand. Valves 34 and 35 may be snap valves if desired.

Although a preferred embodiment of the invention has been illustrated and described herein, it will be understood that the invention is not limited thereby, but is susceptible of changes in form and detail within the scope of the appended claims.

I claim:

1. In an air conditioning system for aircraft and the like having at least one compartment to be cooled, the combination of a source of relatively high pressure air, a source of relatively low pressure air, a cooler for the high pressure air utilizing a vaporizable coolant, an expansion turbine driven by the high pressure air from said cooler and discharging the expanded air to said compartment for cooling the same, a heat exchanger interposed between said high pressure air source and said cooler and supplied with cooling air from said low pressure source for precooling the high pressure air prior to admission thereof to said cooler, and a blower driven by said turbine for drawing the said low pressure cooling air through said heat exchanger.

2. In an air conditioning system for aircraft and the like having at least one compartment to be cooled, the combination of a source of relatively high pressure air, a source of relatively low pressure air, a cooler for the high pressure air utilizing vaporizable refrigerant, an expansion turbine driven by the high pressure air from said cooler and discharging the expanded air to said compartment for cooling the same, a pair of heat exchangers interposed between said high pressure air source and said cooler and supplied with cooling air from said low pressure source for precooling the high pressure air prior to admission thereof to said cooler, and a blower driven by said turbine for drawing the said low pressure cooling air through one of said heat exchangers.

3. In an air conditioning system for aircraft and the like having at least one compartment to be cooled, the combination of a source of relatively high pressure air, a source of relatively low pressure air, a cooler utilizing a coolant vaporized by the high pressure air, means for discharging the vaporized coolant from said cooler to atmosphere, an expansion turbine driven by the high pressure air from said cooler and discharging the expanded air to said compartment for cooling the same, a pair of heat exchangers interposed between said high pressure air source and said cooler and supplied with cooling air from said low pressure source for precooling the high pressure air prior to admission thereof to said cooler, and a blower driven by said turbine for drawing the said low pressure cooling air through one of said heat exchangers.

4. In an air conditioning system for aircraft and the like having at least one compartment to be cooled, the combination of a source of cabin supply air under pressure, a separate source of cooling air, a cooler for the cabin air utilizing vaporizable coolant, an expansion chamber receiving the cooled cabin air from said cooler and discharging the expanded air to said compartment for cooling the same, means for controlling the vaporization rate of the coolant in said cooler, a thermostat responsive to the temperature of the compartment, and operative connections between said thermostat and said last-named means.

5. In an air conditioning system for aircraft and the like having at least one compartment to be cooled, the combination of a source of cabin supply air under pressure, a separate source of cooling air, a cooler for the cabin air utilizing vaporizable coolant, a heat exchanger interposed between said source of cabin supply air and said cooler and supplied with air from said separate source for precooling the cabin supply air prior to its admission into said cooler, an expansion chamber receiving the cooled cabin air from said cooler and discharging the expanded air to said compartment for cooling the same, a by-pass around said cooler, valve means controlling the flow of cabin supply air around said cooler, a thermostat responsive to the temperature in said compartment, and operative connections between said thermostat and said valve means.

6. In an air conditioning system for aircraft and the like having at least one compartment to be cooled, the combination of a source of cabin supply air under pressure, a separate source of cooling air, a cooler for the cabin air utilizing vaporizable coolant, a heat exchanger interposed between said source of cabin supply air and said cooler and supplied with air from said separate source for precooling the cabin supply air prior to its admission into said cooler, an expansion chamber receiving the cooled cabin air from said cooler and discharging the expanded air to said compartment for cooling the same, a valve interposed between said cooler and said expansion chamber for controlling the supply of air to the latter, a thermostat responsive to the temperature of the compartment, and operative connections between said thermostat and said valve.

7. In an air conditioning system for aircraft and the like having at least one compartment to be cooled, the combination of a source of cabin supply air under pressure, a separate source of cooling air, a cooler for the cabin air utilizing vaporizable coolant, a heat exchanger interposed between said source of cabin supply air and said cooler and supplied with air from said separate source for precooling the cabin supply air prior to its admission into said cooler, an expansion chamber receiving the cooled cabin air from said cooler and discharging the expanded air to said compartment for cooling the same, a valve interposed in the path of flow of said cabin supply air between said source of cabin supply air and said compartment for controlling the supply of air to the latter, a thermostat responsive to temperature of the compartment, and operative connections between said thermostat and said valve.

References Cited in the file of this patent

UNITED STATES PATENTS

| Number | Name | Date |
|---|---|---|
| 2,126,266 | Laird | Aug. 9, 1938 |
| 2,477,931 | King | Aug. 2, 1949 |
| 2,477,932 | King | Aug. 2, 1949 |
| 2,509,899 | Wood | May 30, 1950 |
| 2,526,103 | Wood | Oct. 17, 1950 |